United States Patent [19]

Peitsmeier et al.

[11] Patent Number: 4,773,241
[45] Date of Patent: Sep. 27, 1988

[54] UNLOCKING PREVENTION DEVICE FOR A STEERING WHEEL LOCK

[75] Inventors: Karl Peitsmeier, Neuhausen; Gottfreid Schremmer, Tamm, both of Fed. Rep. of Germany

[73] Assignee: Daimler-Benz Aktiengesellschaft, Stuttgart, Fed. Rep. of Germany

[21] Appl. No.: 69,240

[22] Filed: Jul. 2, 1987

[30] Foreign Application Priority Data

Jul. 3, 1986 [DE]  Fed. Rep. of Germany ....... 3622361

[51] Int. Cl.⁴ .............................................. E05B 65/12
[52] U.S. Cl. ...................................... 70/252; 70/182; 70/185
[58] Field of Search ............................ 70/252, 182–189

[56] References Cited

U.S. PATENT DOCUMENTS

| | | | |
|---|---|---|---|
| 3,575,023 | 4/1971 | Shimizu | 70/252 |
| 3,680,335 | 8/1972 | Onishi | 70/252 |
| 3,724,244 | 4/1973 | Schaumberg | 70/252 X |
| 3,789,636 | 2/1974 | Nakashima | 70/252 |
| 3,940,958 | 3/1976 | Kuroki | 70/186 |

FOREIGN PATENT DOCUMENTS

| | | | |
|---|---|---|---|
| 974947 | 5/1961 | Fed. Rep. of Germany | 70/184 |
| 1166642 | 3/1964 | Fed. Rep. of Germany | 70/186 |
| 463825 | 6/1951 | Italy | 70/185 |
| 972434 | 10/1964 | United Kingdom | 70/184 |

Primary Examiner—Robert L. Wolfe
Assistant Examiner—Suzanne L. Dino
Attorney, Agent, or Firm—Barnes & Thornburg

[57] ABSTRACT

An unlocking prevention device for a steering wheel lock of that type having a driver acting on a detent pin and controlled by a locking cylinder shaft. During the unlawful removal of the locking cylinder, the shaft is shifted in its pull out direction by means of a force and the driver thereby engages into a groove, as a result of which the shaft cannot be removed and, because of the changed form of the shaft, the driver can no longer be actuated.

6 Claims, 2 Drawing Sheets

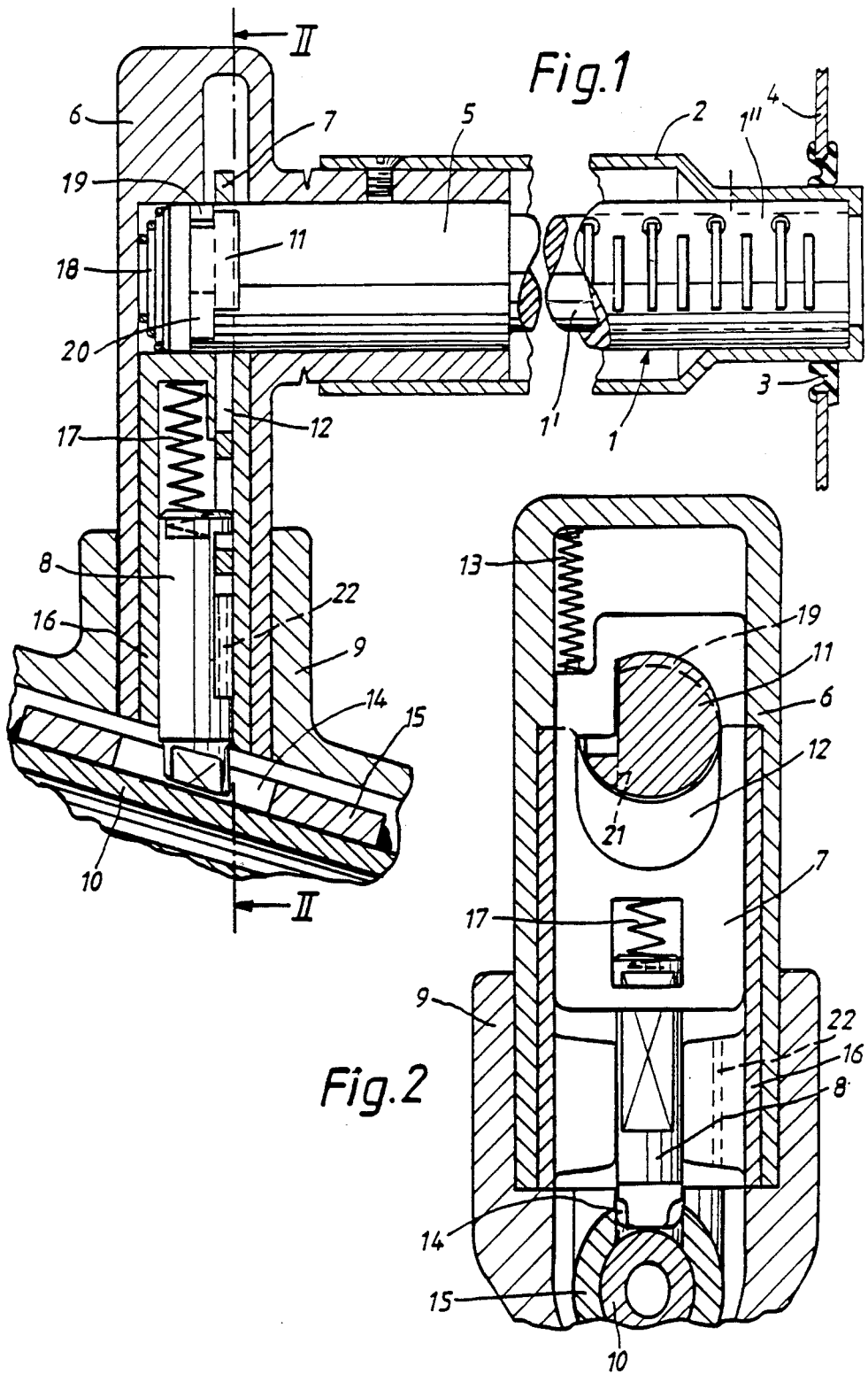

UNLOCKING PREVENTION DEVICE FOR A STEERING WHEEL LOCK

BACKGROUND AND SUMMARY OF THE INVENTION

The invention relates to an unlocking prevention device for a vehicle steering wheel lock of the type having a locking detent bolt actuable by means of a locking cam surface on a locking cylinder.

German Patent Specification No. 3,131,558 describes a steering lock for motor vehicles, in which a detent pin can be blocked in its locking position by a spring-loaded detent piece during the unauthorized removal of the locking cylinder. This detent piece is controlled by a wire fastened to the locking cylinder. A problem which arises in a design of this type is that the wire is parallel to the detent pin which is pulled back during each unlocking operation and which, when it comes into contact with the wire, endeavors to pull this along with it. During the next locking operation, with the wire being taken up the detent piece would drop in, and the detent pin would then be permanently locked unintentionally and the vehicle consequently no longer steerable.

To avoid this danger, it is desirable to prevent the wire from making contact by means of guide ducts or spacers which entail a high outlay in terms of cost in this inaccessible region.

An object of the invention is to improve the above-noted prior arrangement and provide for actuation of an unlocking prevention device for a steering wheel lock for motor vehicles solely as a result of the unlawful opening of the locking system.

This object is achieved by providing shifting force means to shift the locking cylinder shaft toward a detent locking position and to provide means on the locking cylinder shaft and detent pin to prevent lifting of the detent pin when the shaft is in the shifted position.

Because the shaft is shifted after the lock housing has been broken off or unlawfully removed when the detent pin is in the locking position, the detent pin driver is disengaged from the actuating locking cam and thus, like the detent pin, remains in the locking position. The steering wheel lock is blocked reliably against further manipulation because the detent pin driver drops into a shaft groove.

Other objects, advantages and novel features of the present invention will become apparent from the following detailed description of the invention when considered in conjunction with the accompanying drawings.

BRIEF DESCRIPTION OF THE DRAWINGS

FIG. 1 is a partial sectional schematic view which shows a steering wheel locking system with an unlocking prevention device constructed in accordance with a first preferred embodiment of the invention;

FIG. 2 is a sectional view taken along the line II—II of FIG. 1;

DETAILED DESCRIPTION OF THE DRAWINGS

Figure 3:
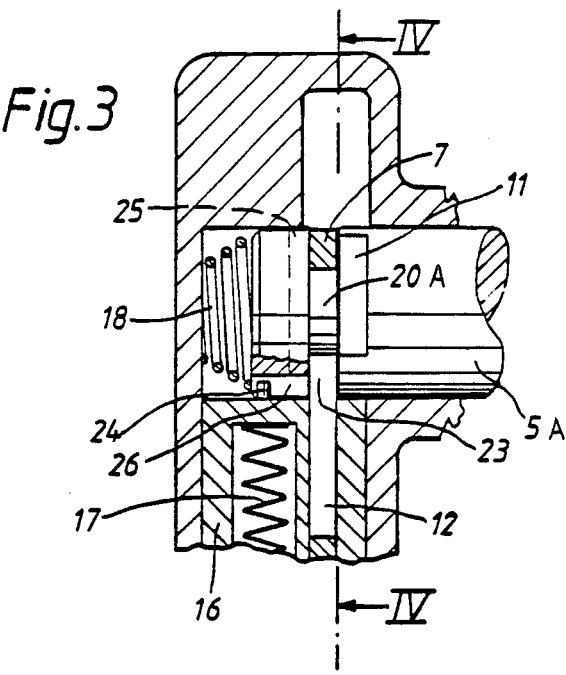
FIG. 3 is a partial sectional schematic view of a steering wheel unlocking prevention device constructed in accordance with another preferred embodiment of the invention.

A locking cylinder 1, comprising a rotatable rotor 1' and a stationary stator 1" and located in a locking cylinder housing 2, is mounted via an O-ring 3 in a dashboard 4, shown only schematically. Rotor 1' is connected fixedly in terms of rotation in a way not shown in more detail to a shaft 5. Shaft 5 engages into a housing 6 which received a driver 7 and a detent pin 8 connected operatively thereto. Housing 6 is itself fitted firmly into a casing receptacle 9 of a steering shaft 10.

Located on the shaft 5 is a locking cam 11 which penetrates into an aperture 12 in the driver 7 and which imparts to the latter, during rotary action exerted by the rotor 1' and by means of the shaft 5, a lifting movement or a lowering movement, as a result of which the detent pin 8 is also shifted.

The lowering movement of the driver 7 is assisted by a prestressed compression spring 13 supported on the housing 6. In the event that during locking the detent pin does not immediately meet an orifice 14 in a steering shaft locking ring 15 connected firmly to the steering shaft 10 and surrounding the latter coaxially, it is introduced into the orifice 14 during a subsequent rotation of the steering shaft 10, by means of a prestressed compression spring 17 supported in a bearing housing 16 for the detent pin 8.

The unlocking prevention device according to FIGS. 1 and 2 is actuated by means of a shifting force which here originates from a spring 18 and which is operable to shift the shaft 5 in its pull-out direction at the moment when the locking cylinder 1 or the locking cylinder housing 2 is removed. Should the detent pin 8 and the locking cam 11 at the same time be in the locking position shown, the driver 7 engages into a partial peripheral groove 19, with the result that the shaft 5 can no longer be shifted any further.

Simultaneously, a driver lift preventing means 20 is brought into the operative position, this having a flattened lifting cam shape 21, by means of which the driver 7 is jammed during an attempt to rotate the shaft 5, so that it can no longer execute a lifting movement. The detent pin thus rests firmly in the orifice 14 in the steering shaft locking ring 15.

So that this unlocking prevention device can be transported without transport protection before the steering wheel lock is fitted, there is in the bearing housing 16 an additional bore 22, through which the drive 7 can be lifted by means of a wire after the unlocking prevention device has been inadvertently triggered. The shaft 5 can then be pushed back into its unblocked position. This bore 22 is no longer accessible when the steering wheel lock is in its installed state.

Figure 4:
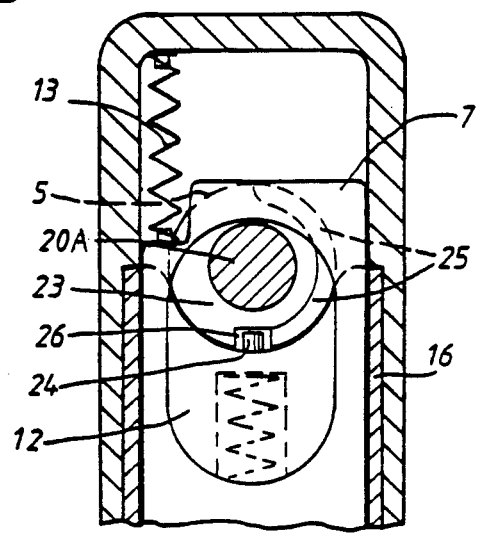
FIG. 4 is a sectional view taken along the line IV—IV of FIG. 3.

FIGS. 3 and 4 illustrate a further design of an unlocking prevention device, in which the driver lift preventing means 20A is formed by a peripheral groove 23 which is made in the shaft and into which the driver 7 drops when the shaft 5A is shifted, and it can no longer be actuated as a result of the rotation of the shaft 5 because of the uniformly reduced diameter of the shaft 5 at groove 23, whereas it prevents at the same time a further shifting of the shaft 5A.

So that it is possible to remove the locking cylinder 1, for example for repair purposes, the shaft 5 can be brought into a removal position which corresponds not to the locking position, but usually to a 90° rotation starting from the locking position. In this position, a peg 24 mounted on the bearing housing 16 engages into a half-side peripheral groove 25 extending along the shaft 5 in the possible direction of rotation of the latter, with the result that, even when the locking cylinder 1 is removed, the shaft 5 supported in the axial direction on the peg 24 cannot be shifted in its direction of removal by means of the spring 18.

After the locking cylinder housing 2 has been reattached, and with the detent pin 8 in the blocking position, this peg 24 rests in a longitudinal groove 26 which is parallel to the shaft axis and which allows a shifting travel of the shaft 5 necessary for triggering the blocking effect.

Thus, the driver 7 assumes its engaging position automatically as a result of the shifting of the shaft 5.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Unlocking prevention device for a steering wheel lock for motor vehicles, especially motor cars, of the type with a detent bolt actuable by means of a locking cylinder, a locking cam which is coupled to the locking cylinder and is located on a shaft and which shifts a driver extending at an angle to its axis of rotation acting on the detent pin, comprising shifting force means which acts on the shaft in its pull-out direction, a partial peripheral groove means in the shaft behind the locking cam in the pull-out direction, said partial peripheral groove being configured so that the drive engages therein at least in the locking position of the locking cam and with the shaft shifted in its pull-out direction as a result of unlawful action, so as to prevent the shaft from being shifted further, and driver lift preventing means for preventing a lifting movement of the driver in the event of a subsequent rotary action on the shaft after the shaft is shifted in its pull-out direction.

2. Unlocking prevention device for a steering wheel lock according to claim 1, wherein the shifting force means, includes a prestressed spring.

3. Unlocking prevention device for a steering wheel lock according to claim 1, wherein the driver includes an aperture through which the shaft extends, said driver lift preventing means including a lifting cam shape on the shaft which jams the driver when the shaft is rotated.

4. Unlocking prevention device for a steering wheel lock according to claim 1, wherein said driver lift prevention means includes a peripheral groove provided in the shaft.

5. Unlocking prevention device for a steering wheel lock according to claim 3, wherein the shifting force means, includes a prestressed spring.

6. Unlocking prevention device for a steering wheel lock according to claim 4, wherein the shifting force means, includes a prestressed spring.

* * * * *